UNITED STATES PATENT OFFICE.

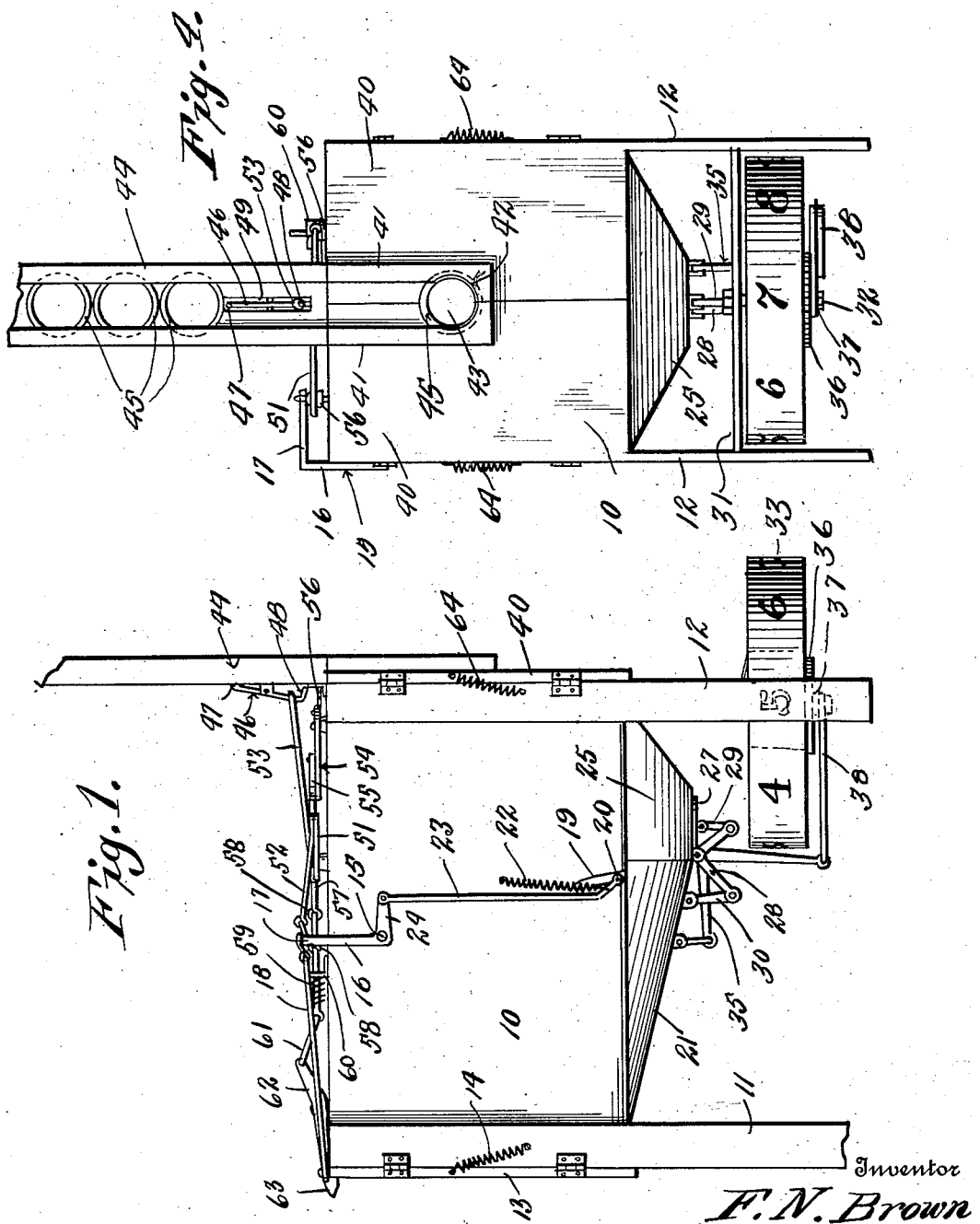

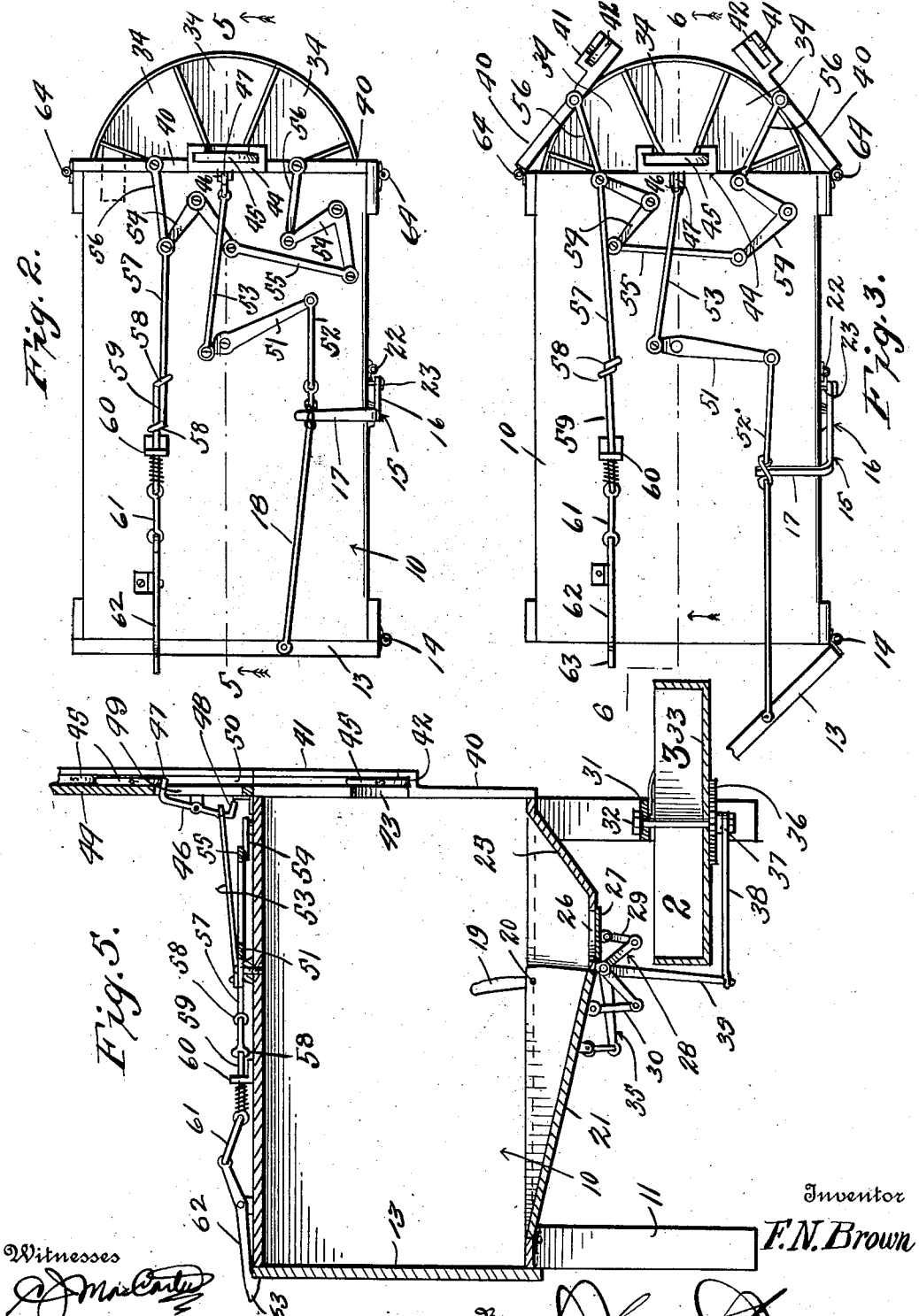

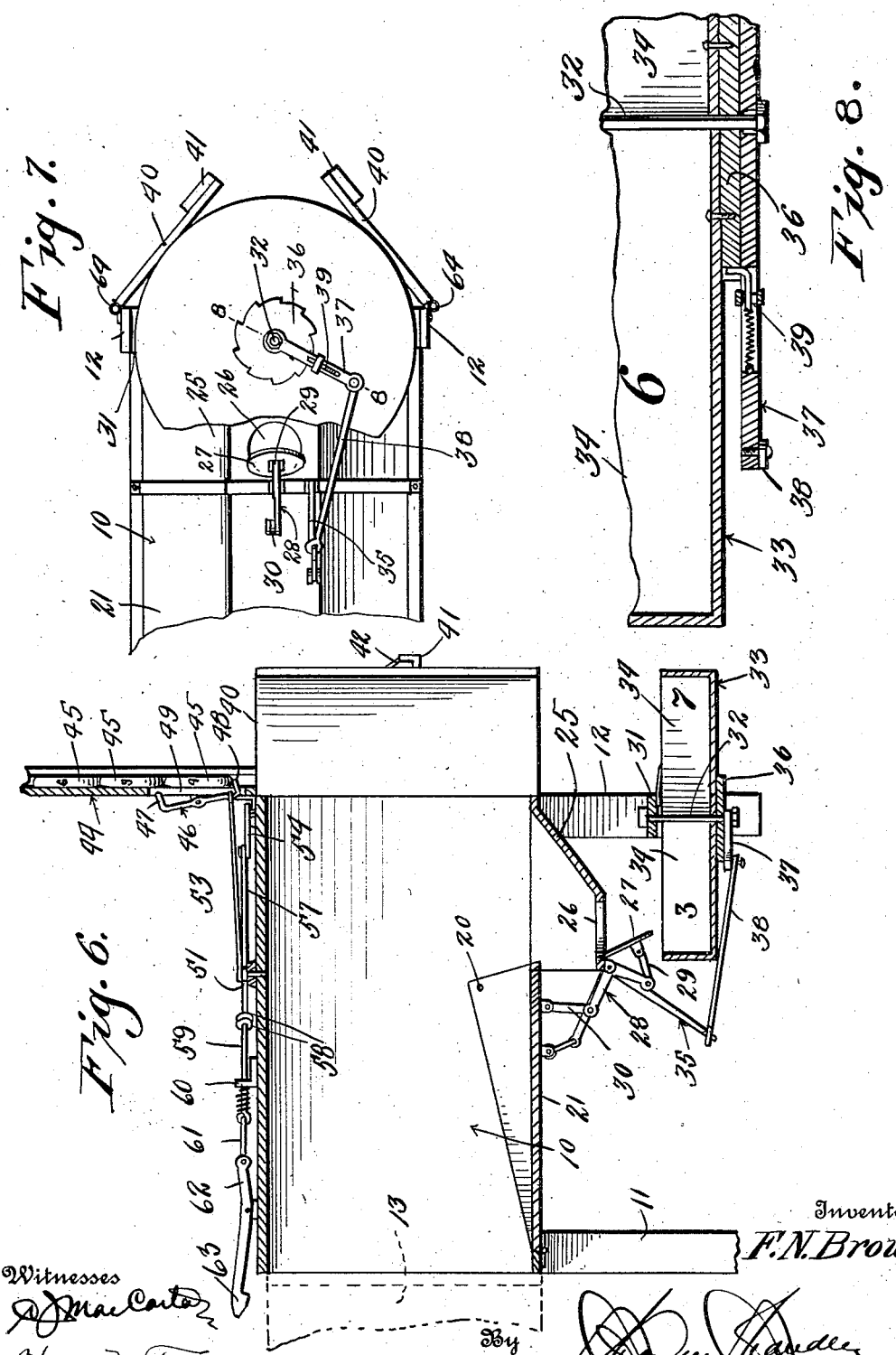

FRANK N. BROWN, OF ST. JOHNSVILLE, NEW YORK.

AUTOMATIC TRAP-NEST.

1,096,017. Specification of Letters Patent. Patented May 12, 1914.

Application filed June 17, 1913. Serial No. 774,202.

*To all whom it may concern:*

Be it known that I, FRANK N. BROWN, a citizen of the United States, residing at St. Johnsville, in the county of Montgomery, State of New York, have invented certain new and useful Improvements in Automatic Trap-Nests; and I do hereby declare the following to be a full, clear, and exact description of the invention, such as will enable others skilled in the art to which it appertains to make and use the same.

This invention relates to improvements in hens' nests, and particularly to trap nests.

The principal object of the invention is to provide a trap nest by means of which a tally can be kept on the hens that enter the nest as to which hens lay eggs, and just how many eggs each hen lays.

Other objects reside in the construction, combination and arrangement of the various parts to trap the hen and to operate certain parts so that the eggs will not be mixed, and the hens receive marks which correspond to receptacles into which the eggs are discharged.

In the drawings: Figure 1 is a side elevation of the nest. Fig. 2 is a top plan view, showing the nest in closed position. Fig. 3 is a top plan view, showing the nest in the position assumed when the hen is leaving the nest. Fig. 4 is a front elevation of the nest in closed position. Fig. 5 is a vertical longitudinal sectional view on the line 5—5 of Fig. 2. Fig. 6 is a vertical longitudinal sectional view on the line 6—6 of Fig. 3. Fig. 7 is a bottom plan view of the nest, the parts being in the position shown in Figs. 3 and 6. Fig. 8 is an enlarged detailed perspective view of the ring chute and portions of the operating mechanism therefor which are connected thereto.

Referring particularly to the accompanying drawings, 10 represents an elongated box supported by the front and rear legs 11 and 12, respectively. Hinged to the front end of the box is a door 13, this door being provided with the springs 14. Mounted on one side of the box and centrally near the upper side thereof is a bell-crank lever 15, the arm 16 of which has a right angular extension 17 projecting over the top of the box and connected to the door 13 by means of a link 18. In the lower portions of the sides of the box are formed the arcuate slots 19 through which project the lugs 20 which are carried by the free end of a hinged bottom 21 disposed within the box. Connected to each of the lugs 20 at one of its ends and to the side of the box at its other end, is a coil spring 22, these springs holding the hinged bottom normally in elevated position, as clearly shown in Fig. 6. Also connected to one of the lugs 20 is one end of a link 23, the opposite end of the link being connected to the arm 24 of the bell-crank 16. The bottom 21 extends approximately two-thirds of the length of the box, and when depressed, forms a continuation of the stationary inclined bottom 25, these portions 21 and 25, when so registered, forming the nest. In the bottom of the member 25 is formed an egg outlet opening 26, this opening being closed by a hinged trap door 27. Mounted adjacent the hinged side of the door 27 is a bell-crank lever 28, one arm of which is connected to the door by means of a link 29, while the other arm is connected to the hinged bottom 21 by means of a link 30.

Extending transversely between and connected to the legs 12, is a bar 31, through which extends a vertical pivot bolt 32 carrying thereon a circular pan or tray 33. This pan is divided into a plurality of radial compartments 34 which are designated by any suitable marks as numbers or letters, and in consecutive order. Also pivotally mounted on the bottom 25 is a bell-crank lever 35, one arm of which is connected to the hinged bottom 21. Rigidly carried on the pivot bolt 32 is a ratchet wheel 36, and loosely mounted on the said bolt below the ratchet wheel is an arm 37. This arm is connected at its outer end to the other arm of the bell-crank lever 35 by means of the link 38, said lever carrying a spring pressed pawl 39 which is disposed in engagement with the teeth of the ratchet wheel 36.

In the end of the box over the tray 33 are mounted the pair of hinged doors 40. Each of these doors carries a portion 41 of a slide-way, and having their lower ends turned inwardly to provide a curved bottom 42. This bottom registers with the lower portion of a circular opening 43 formed through the meeting edges of the doors 40. Mounted on the top of the box and extending vertically above the members 41 and in line therewith is a chute or slide-way 44, and disposed in this slide-way are the rings 45. These rings are of some light material and are provided with numbers corresponding with the numbers of the compartments of the tray 33.

Pivoted centrally of its length on the rear of the chute 44, and near the lower end thereof, is a detent lever 46, this lever having the upper and lower forwardly projecting ends 47 and 48 which project through an opening 49 in said chute. Pivotally mounted on the top of the box is an arm 51, to one end of which is connected a link 52 pivotally carried by the outer end of the arm 17 of the bell-crank 15. To the other end of the arm 51 is connected one end of a link 53, this link having its other end connected to the lower end of the detent lever 46.

In the normal position of the detent lever, the lower projecting end 48 extends below the lowermost of the rings 45, so that the vertical series of rings 45 is supported above the doors 40. In this position, the upper projecting end 47 is out of line of the rings, but is disposed immediately opposite the lower portion of the opening of the next to the bottom ring. When the detent lever 46 is rocked on its pivot, the projection 47 moves into the opening of the ring next to the bottom, while the projection 48 is withdrawn from beneath the bottom of the bottom ring, thus permitting the bottom ring to fall down through the slide-ways 41 and rest on the curved bottom walls 42 thereof. The series of rings then fall so that the upper portion of the bottom ring rests on the upper projection 47.

Mounted on the top of the box adjacent the doors 40 are two bell-crank levers 54, each of which is connected by one of its arms to a transversely extending link 55. Each of the other arms of the bell-crank is connected to one of the doors 40 by means of a link 56. Connected to the arm of the bell-crank lever 54 which carries the link 56, is one end of a longitudinally extending rod 57, the opposite end of which has sliding connection, by means of the eye-members 58 with a similarly extending shorter rod 59. This rod 59 is guided through an apertured plate 60 on the top of the box and is connected by a link 61 to a pivoted latch 62, the hooked end 63 of which projects over the end of the box for engagement with and the retention of the door 13. The doors 40 are also provided with springs 64.

The operation of the device may be described as follows: In the normal position of the device, the door 13 stands open as does also the trap door 27, the hinged bottom 21 being in elevated position. The hen enters through the door-way at the end which carries the door 13, and stepping on the bottom 21, depresses the same until it registers with the bottom 25 against the tension of the springs 22. This downward movement of the bottom 21 rocks the bell-crank 28 and closes the trap door 27. At the same time, the link 23 rocks the bell-crank 15 which pulls the door 13 to closed position by means of the link 18. The door when closed, engages under the latch 63 and is held closed thereby. This movement of the bell-crank 15 rocks the arm 51 so that the link 53 moves the detent lever 46 on its pivot and permits the bottommost ring 45 to fall down to the bottom of the slide-way 41 opposite the opening 43. Also, at the same time that the above operations take place, the crank 35 is rocked by the downward movement of the bottom 21, so that the lever 37 is moved on the pivot bolt 32 to turn the tray 33 and bring the proper compartment under the opening 26, this compartment corresponding in number to the ring which is disposed opposite the opening 43.

When the hen has laid an egg, the egg will rest on the trap door 27. To get out of the nest, the hen will naturally thrust her head through the opening 43, thus engaging the ring around her neck. The neck feathers will prevent the ring from disengagement, and it can be readily ascertained, by examining the number on the ring and also the egg in the compartment of the tray of this number, the eggs which the different hens lay and how many eggs each hen lays. When the hen has thrust her head through the opening 43, she can push open the doors 40 by pressing her shoulders thereagainst. This opening movement of the doors 40 pulls on the loops 56 which rock the bell-crank levers 54, and when the eyes 58 engage each other, the latch 62 will be lifted to permit the door 13 to fly open under the influence of the springs 14. The removal of the weight of the hen from the bottom 21, permits the bottom to rise under the influence of the springs 22. This rocks the bell-crank 28, and opens the trap door 27, thus permitting the egg to be discharged from the nest into the proper compartment of the tray. The upward movement of the bottom 21 rocks the bell-crank 15 back into its original position by means of the link 23, and in so moving, rocks the lever 51 so that the detent lever 46 is moved to permit the lowest ring of the series to drop and rest on the projection 48. When the hen has left the nest, the doors 40 automatically close by means of the springs 64 and move the eyes 58 out of engagement with each other, so that the latch 62 can act under the influence of the spring 65 carried by the rod 59, between the guide 60 and the link 61. The nest is then in position for the next hen, the operations just described being repeated when the next hen enters the nest.

From the foregoing it will readily be seen that I have provided a trap nest by means of which an accurate record can be kept of the hens which lay, and how many eggs they lay.

It will of course be understood that the rings are removed from the hens after they have gone to roost and can be easily handled, the rings being then placed in the chute 44 in their proper order.

I claim:—

1. In a trap nest, an inclosure having a spring-actuated entrance door and spring-actuated exit doors, a divided egg-receiving tray disposed below the exit doors, a plurality of marking devices carried by the inclosure, the compartments of the tray and the marking devices being correspondingly marked and arranged, means actuated by the entering hen for simultaneously moving the tray and the corresponding marking device into operative position, and means actuated by the departing hen for depositing the egg in the compartment of the tray for applying the marking device to the hen.

2. A trap nest including an inclosure, an entrance door at one end of the inclosure, spring-actuated exit doors at the opposite end of the inclosure, registering slideways carried by the exit doors, a tilting floor in the lower portion of the inclosure, a rotatable divided tray disposed beneath the inclosure, the bottom of the inclosure having an egg exit opening, a trap door for the opening, means actuated by the said tilting floor for simultaneously moving the tray and closing the trap door upon the entrance of a hen, said exit doors being arranged to be opened by the departing hen and connections between the tilting floor and the entrance door for opening the door when the said floor is relieved of the weight of the hen.

3. In a trap nest, an inclosure having a spring-actuated entrance door and spring-actuated exit doors, a divided egg receiving tray rotatably mounted below the exit doors, a divided slideway carried partly by the inclosure and partly by the exit doors, a series of marking rings carried in the slideway, means actuated by the entering hen for simultaneously moving the tray and one of the marking rings into operative positions, the exit doors being arranged to be opened by the departing hen, and means actuated by the opening of the exit doors for depositing the egg in the proper compartment, applying a marking ring to the hen, and opening the entrance door.

In testimony whereof, I affix my signature, in the presence of two witnesses.

FRANK N. BROWN.

Witnesses:
GEORGE A. ALLEN,
MARTIN KEEGAN.